(12) United States Patent
McLean et al.

(10) Patent No.: US 12,502,263 B2
(45) Date of Patent: *Dec. 23, 2025

(54) DENTAL CLEANER DISCHARGE GUARD SYSTEMS AND METHODS

(71) Applicant: Ultradent Products, Inc., South Jordan, UT (US)

(72) Inventors: Bruce S. McLean, Sandy, UT (US); Scot N. Andersen, Draper, UT (US); Dan E. Fischer, Sandy, UT (US)

(73) Assignee: Ultradent Products, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,952

(22) Filed: Mar. 25, 2024

(65) Prior Publication Data

US 2024/0225803 A1    Jul. 11, 2024

Related U.S. Application Data

(63) Continuation of application No. 17/366,905, filed on Jul. 2, 2021, now Pat. No. 11,937,990, which is a
(Continued)

(51) Int. Cl.
*A61C 17/22* (2006.01)
*A46B 3/00* (2006.01)
(Continued)

(52) U.S. Cl.
CPC ............ *A61C 17/222* (2013.01); *A46B 3/005* (2013.01); *A46D 1/0238* (2013.01);
(Continued)

(58) Field of Classification Search
CPC ..... A61C 17/222; A61C 17/005; A61C 17/24; A61C 17/22; A61C 17/16; A46B 3/005;
(Continued)

(56) References Cited

U.S. PATENT DOCUMENTS 1,682,548 A    8/1928    Bigoney
1,720,017 A    7/1929    Touchstone
(Continued)

FOREIGN PATENT DOCUMENTS

DE    19942147    3/2001
EP    1774924 A1    4/2007
(Continued)

OTHER PUBLICATIONS

Pfenniger et al., Plastic Bristles Particularly For Toothbrush Manufacture, Have An Inner Core And An Outer Which Is Removed For A Small Distance At The Free End Of Each Bristle, DE-19942147-A1 (Year: 2001).*
(Continued)

*Primary Examiner* — Eric J Rosen
*Assistant Examiner* — Mirayda A Aponte
(74) *Attorney, Agent, or Firm* — Maschoff Brennan

(57) ABSTRACT

Rotating dental systems and related guards and methods are disclosed. In some instances, a guard may be configured to prevent material from building up on at least a portion of the dental system. The guard may be configured to prevent materials from being discharged from the dental system. In some embodiments, the guard may also be configured to direct the flow of material along a portion of the dental system. Some guards within the scope of this disclosure may include bristles.

16 Claims, 11 Drawing Sheets

Related U.S. Application Data continuation of application No. 15/915,891, filed on Mar. 8, 2018, now Pat. No. 11,051,920.

(60) Provisional application No. 62/469,773, filed on Mar. 10, 2017.

(51) Int. Cl.
  *A46D 1/00* (2006.01)
  *A61C 17/00* (2006.01)
  *A61C 17/24* (2006.01)

(52) U.S. Cl.
  CPC ......... *A46D 1/0276* (2013.01); *A46D 1/0284* (2013.01); *A61C 17/005* (2013.01); *A61C 17/24* (2013.01)

(58) Field of Classification Search
  CPC ...... A46B 3/00; A46D 1/0238; A46D 1/0276; A46D 1/0284; A46D 1/02
  USPC .......................................................... 433/116
  See application file for complete search history.

(56) References Cited

U.S. PATENT DOCUMENTS

| | | | |
|---|---|---|---|
| 2,943,343 A * | 7/1960 | Jankelson | ............ A61C 17/005 |
| | | | D24/146 |
| 3,621,577 A | 11/1971 | Spinello | |
| 3,727,315 A | 4/1973 | Spinello | |
| 4,015,307 A | 4/1977 | Kossak | |
| 5,131,846 A | 7/1992 | Hall | |
| 5,584,690 A | 12/1996 | Maassarani | |
| 8,566,993 B1 | 10/2013 | Ukaj | |
| 8,784,102 B1 * | 7/2014 | Kumar | .................. A61C 1/141 |
| | | | 433/116 |
| 2006/0117506 A1 | 6/2006 | Gavney, Jr. et al. | |
| 2006/0292522 A1 | 12/2006 | Lees | |
| 2010/0186183 A1 * | 7/2010 | Weinberger | ........ A46B 15/0055 |
| | | | 15/236.02 |
| 2012/0204371 A1 * | 8/2012 | Chun | .................... A46B 9/028 |
| | | | 15/167.1 |
| 2016/0287362 A1 | 10/2016 | Montana | |
| 2019/0045913 A1 * | 2/2019 | Langenegger | ......... A46B 9/028 |

FOREIGN PATENT DOCUMENTS

| | | | |
|---|---|---|---|
| GB | 2132077 | 7/1984 | |
| GB | 2132077 A * | 7/1984 | ................ B60S 1/38 |
| WO | 2004062573 | 7/2004 | |

OTHER PUBLICATIONS

International Search Report and Written Opinion dated Jun. 29, 2018 for PCT/US2018/021583.
Notice of Allowance Mar. 3, 2021 for U.S. Appl. No. 15/915,891.
Office Action dated Jan. 2, 2019 for U.S. Appl. No. 15/915,891.
Office Action dated Mar. 31, 2020 for U.S. Appl. No. 15/915,891.
Office Action dated Jun. 21, 2019 for U.S. Appl. No. 15/915,891.
Office Action dated Jul. 30, 2020 for U.S. Appl. No. 15/915,891.

* cited by examiner

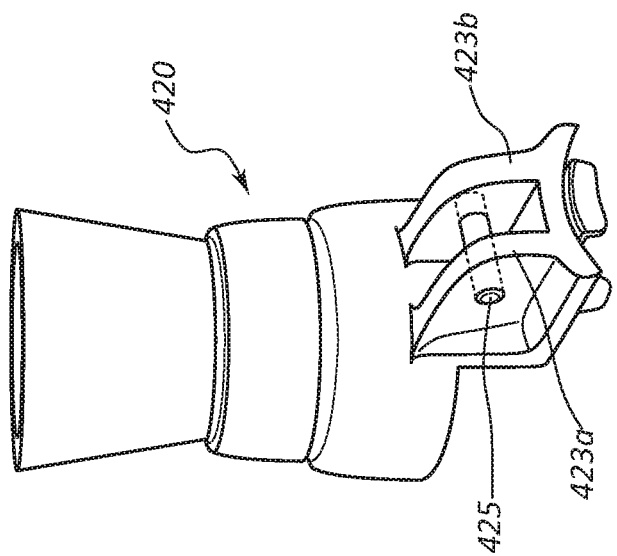
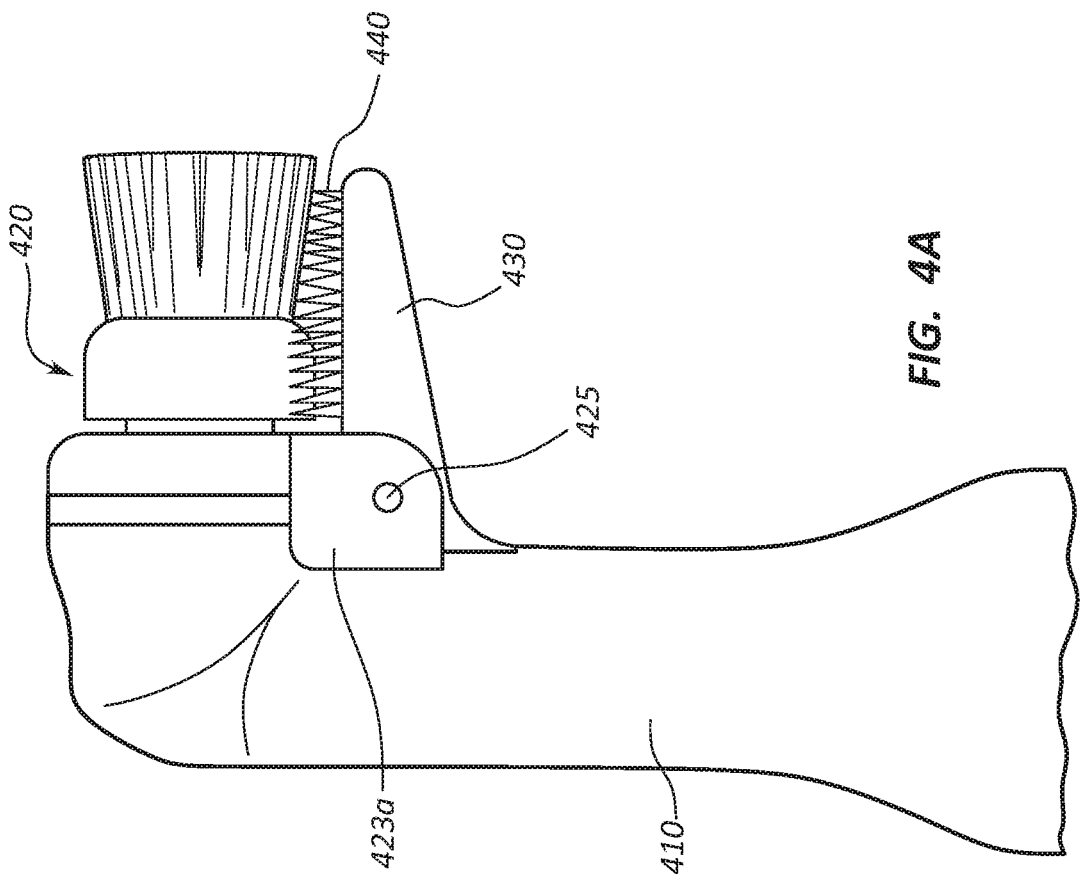
FIG. 4B
FIG. 4A

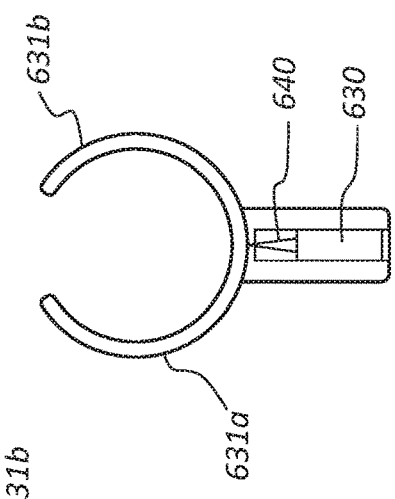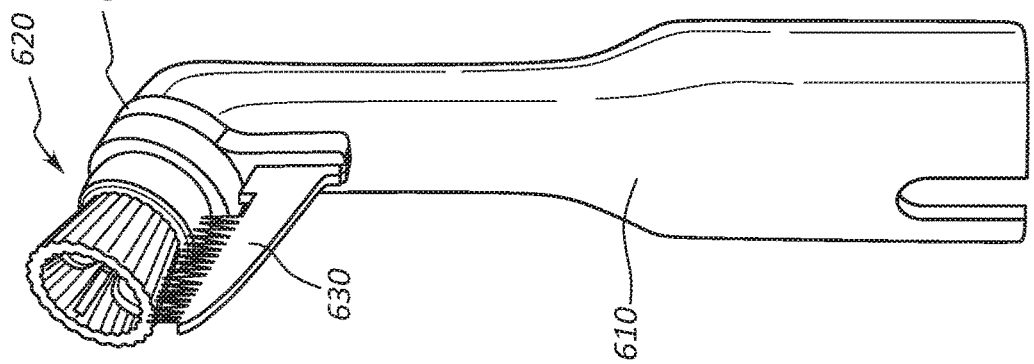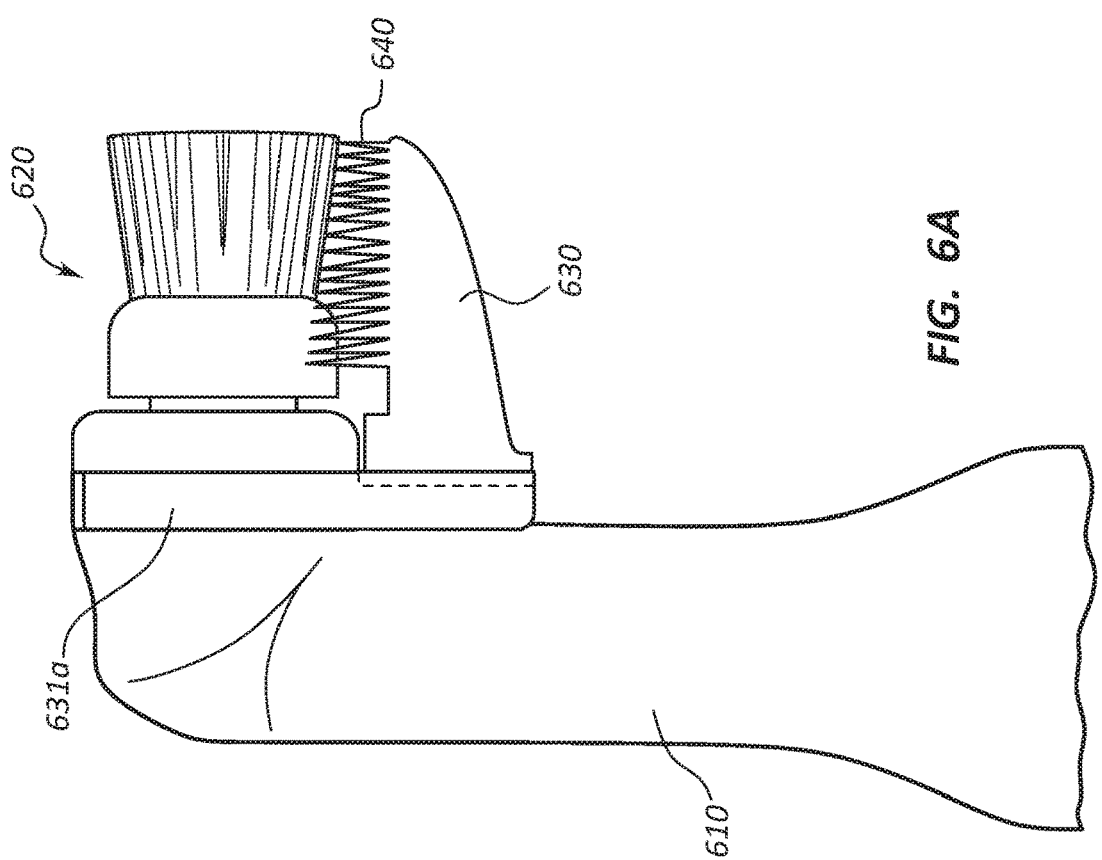

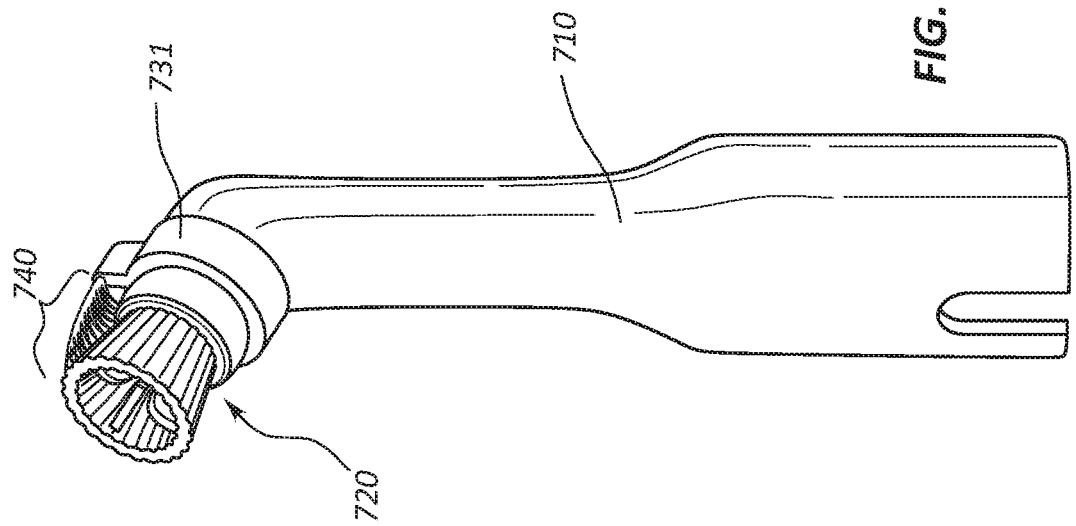
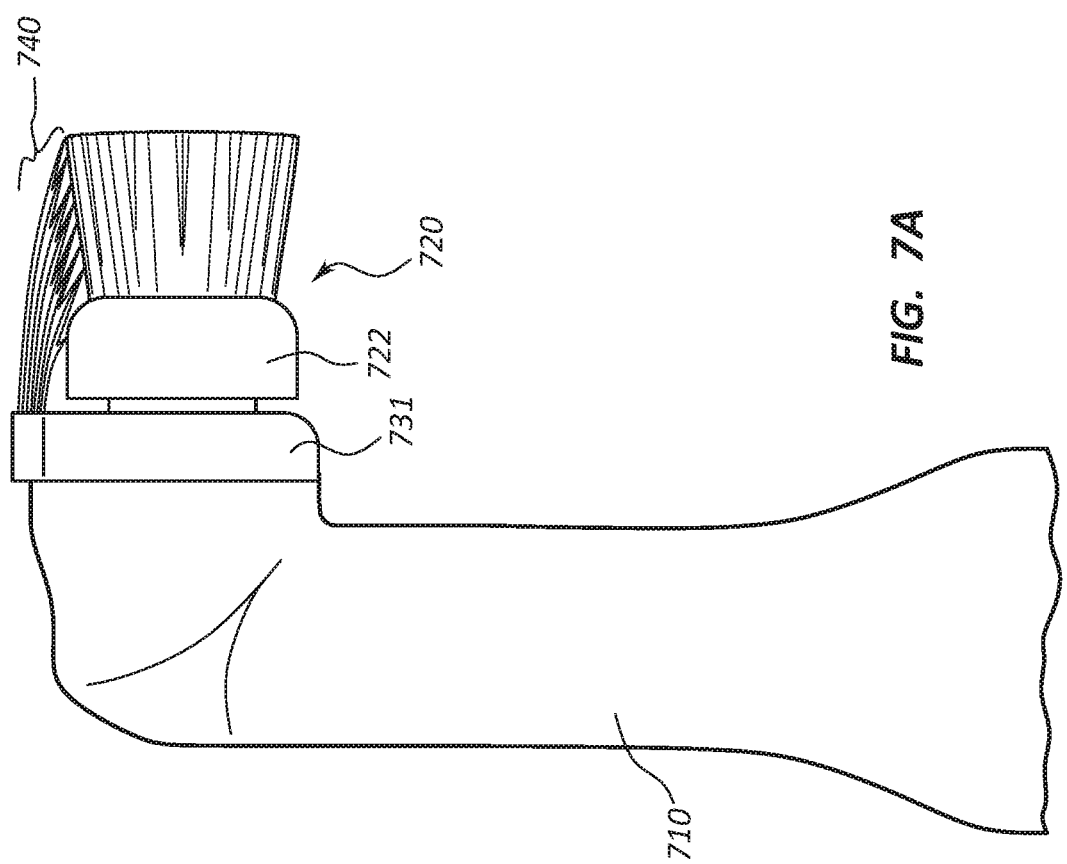
FIG. 7A
FIG. 7B

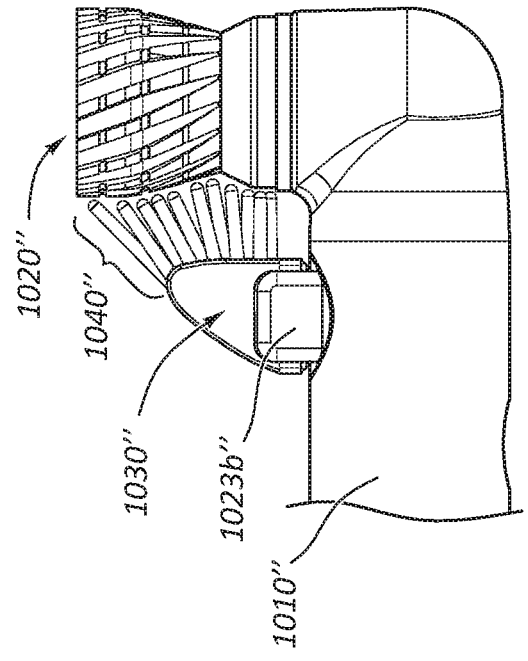
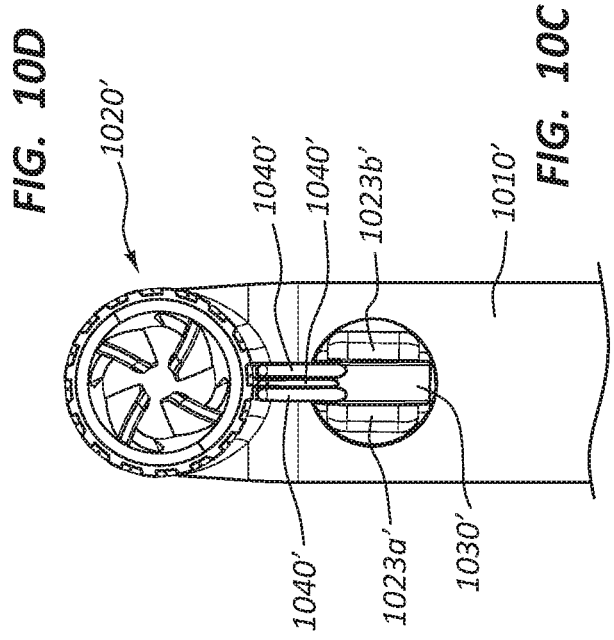
FIG. 10D
FIG. 10C
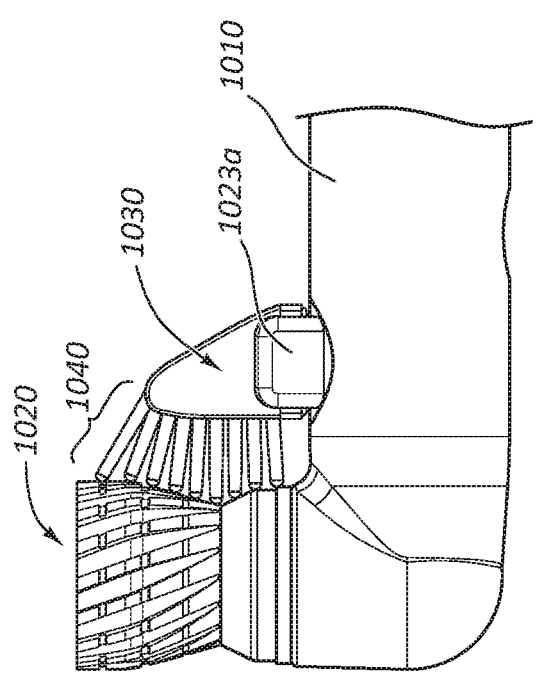
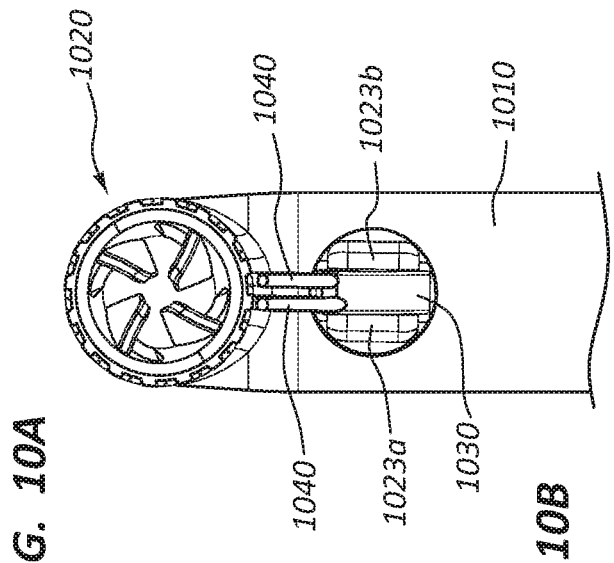
FIG. 10A
FIG. 10B

DENTAL CLEANER DISCHARGE GUARD SYSTEMS AND METHODS

CROSS-REFERENCE TO RELATED APPLICATIONS

This application is a continuation of U.S. patent application Ser. No. 17/366,905, titled "Dental Cleaner Discharge Guard Systems and Methods," filed Jul. 2, 2021, now U.S. Pat. No. 11,937,990, issued Mar. 26, 2024, which is a continuation of U.S. patent application Ser. No. 15/915,891, filed Mar. 8, 2018, titled "Dental Cleaner Discharge Guard Systems and Methods," now U.S. Pat. No. 11,051,920, issued Jul. 6, 2021, which claims priority to U.S. Provisional Application No. 62/469,773, filed on Mar. 10, 2017, titled, "Dental Cleaner Discharge Guard Systems and Methods," each of which is incorporated by reference in its entirety.

BACKGROUND

Technical Field

The present disclosure relates generally to the field of dental devices. More particularly, some embodiments relate to systems and methods for reducing discharge or ejection of materials from a dental cleaner device

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 4A is a side view of a prophy cup and guard coupled to a handle.

FIG. 4B is a front perspective view of the prophy cup of FIG. 4A with the guard and handle removed to show engagement features of the prophy cup.

FIG. 6A is a side view of a discharge guard coupled to a prophy cup and handle.

FIG. 6B is a perspective view of the discharge guard, handle, and prophy cup of FIG. 6A.

FIG. 6C is a top view of the discharge guard of FIG. 6A.

FIG. 7A is a side view of another embodiment of a discharge guard coupled to a prophy cup and handle.

FIG. 7B is a perspective view of the discharge guard, prophy cup, and handle of FIG. 7A.

FIG. 10A is a side view of an embodiment of a discharge guard coupled to a handle and interacting with a prophy cup.

FIG. 10B is a top view of the discharge guard of FIG. 10A, the discharge guard having two rows of bristles.

FIG. 10C is a top view of an embodiment of a discharge guard with three rows of bristles.

FIG. 10D is a side view of an embodiment of a discharge guard with a staggered arrangement of bristles.

DETAILED DESCRIPTION

The components of the embodiments as generally described and illustrated in the figures herein can be arranged and designed in a wide variety of different configurations. Thus, the following more detailed description of various embodiments, as represented in the figures, is not intended to limit the scope of the present disclosure but is merely representative of various embodiments. While various aspects of the embodiments are presented in drawings, the drawings are not necessarily drawn to scale unless specifically indicated.

The phrase "coupled to" is broad enough to refer to any suitable coupling or other form of interaction between two or more entities, including mechanical interaction. Two components may be coupled to each other even though they are not in direct contact with each other. The phrases "attached to" and "attached directly to" and "attachable" refer to interaction between two or more entities which are in direct contact with each other and/or are separated from each other only by a fastener of any suitable variety (e.g., mounting hardware or an adhesive).

The terms "proximal" and "distal" are opposite directional terms. For example, the distal end of a device or component is the end of the component that is furthest from the practitioner during ordinary use. The proximal end refers to the opposite end or the end nearest the practitioner during ordinary use.

A wide variety of dental tools and/or dental cleaning systems comprise one or more rotating components. A rotating dental tool may include rotating components that may be utilized to clean, polish, grind, or otherwise treat a patient's teeth. For example, treatment cups such as prophy cups are dental instruments configured for cleaning and polishing teeth. A handle component may be configured to rotate a prophy cup about an axis, allowing a practitioner to utilize the rotating cup to clean and polish teeth. While various specific examples below refer to systems comprising prophy cups, disclosure relating to discharge guards and related systems may be analogously applied to other rotating tools, including drills, mills, abrasive grinding tools, brushes, buffing tools, and so forth.

Figure 1A:
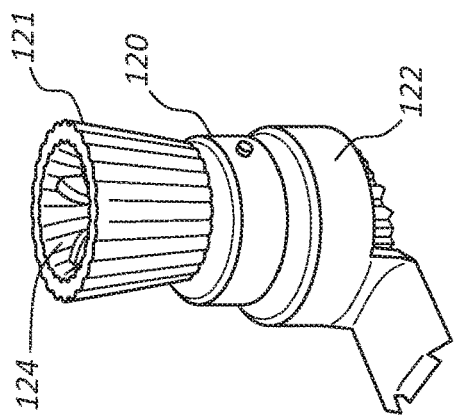
FIG. 1A is a perspective view of a prophy cup.
Figure 1B:
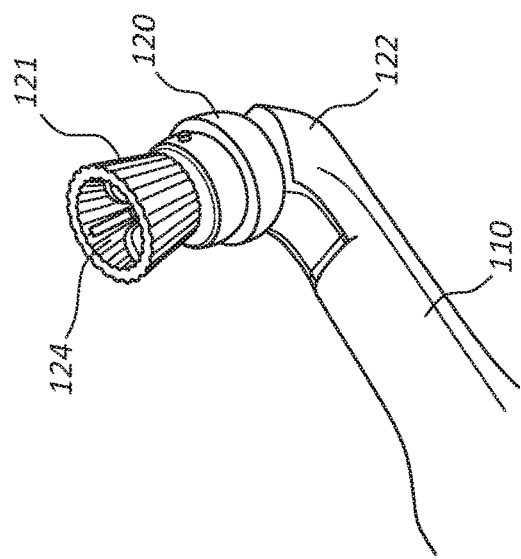
FIG. 1B is a perspective view of the prophy cup of FIG. 1A partially coupled to a handle.
Figure 1C:
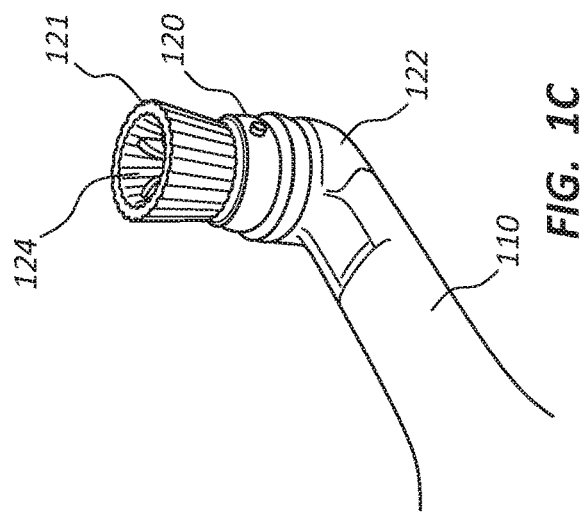
FIG. 1C is a perspective view of the prophy cup and handle of FIG. 1B with the prophy cup fully coupled to the handle.

FIG. 1A is a perspective view of a prophy cup 120. FIG. 1B is a perspective view of the prophy cup 120 of FIG. 1A partially coupled to a handle 110. FIG. 1C is a perspective view of the prophy cup 120 and handle 110 of FIG. 1B with the prophy cup 120 fully coupled to the handle 110. Mechanisms within the handle 110 may be configured to rotate the prophy cup 120 about its axis, such that a practitioner may clean or polish a patient's teeth with the prophy cup 120. In some instances, a cleaning or polishing compound or paste may be disposed within an interior portion 124 of the prophy cup 120 to further aid in cleaning and polishing.

The prophy cup 120 may be removably coupled to the handle 110. In some instances, one or more engagement features disposed on the base 122 of the prophy cup 120 may mate with one or more engagement features on the handle 110 to couple the prophy cup 120 to the handle 110. In some instances, the prophy cup 120 may couple to the handle 110 via a snap-fit type connection.

As shown in FIGS. 1A, 1B, and 1C, the prophy cup 120 may comprise a cup portion 121 coupled to the base 122. The cup portion 121 is configured to rotate about its axis, allowing a practitioner to clean and/or polish teeth by bringing the rotating prophy cup 120 into contact with the patient's teeth.

As the prophy cup 120 rotates during use, cleaning agents such as a polishing compound or a paste may tend to be pushed to the outer rim of the cup portion 121 due to interaction with the patient's teeth and due to centrifugal forces associated with the spinning prophy cup 120. Furthermore, polishing compounds and pastes may mix with liquid, such as a patient's saliva, creating a wet mixture of these compounds.

In some instances, polishing compounds, saliva, and/or a mixture of both may be thrown from the rim of a spinning prophy cup 120 due to centrifugal forces. As used herein, "discharge materials" refer to any materials that may build up on the rim of a prophy cup, a such as polishing compounds, pastes, saliva, or mixtures thereof. In some instances, these discharge materials may build up on an outside surface of the cup portion 121 of the prophy cup 120. When this build up reaches sufficient mass, it may be discharged or thrown from the prophy cup 120. This can complicate the treatment process as polishing compound is lost and the discharge may necessitate cleaning of surrounding areas or extra use of bibs or shields to prevent the mixture from landing on a patient or practitioner.

FIGS. 2A-2E depict an embodiment of a prophy cup 220 and handle 210 that resemble the prophy cup 120 and handle 110 described above in certain respects. Accordingly, like features are designated with like reference numerals, with the leading digits incremented to "2." Relevant disclosure set forth above regarding similarly identified features thus may not be repeated hereafter. Moreover, specific features of prophy cup 120, handle 110, and related components shown in FIGS. 1A-1C may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the prophy cup 220, handle 210, and related components depicted in FIGS. 2A-2E. Any suitable combination of the features, and variations of the same, described with respect to the prophy cup 120, handle 110, and related components illustrated in FIGS. 1A-1C can be employed with the prophy cup 220, handle 210, and related components of FIGS. 2A-2E, and vice versa. This pattern of disclosure applies equally to further embodiments depicted in subsequent figures and described hereafter, wherein the leading digits may be further incremented.

Figure 2A:
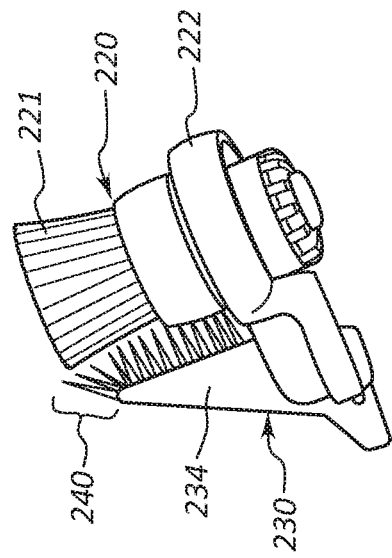
FIG. 2A is a side perspective view of a prophy cup and a discharge guard.

FIG. 2A is a side perspective view of a prophy cup 220 and a discharge guard 230. The prophy cup 220 comprises a base 222 and a cup portion 221. The discharge guard 230 may comprise a body member 234 and a plurality of bristles 240 as illustrated in FIG. 2A. The body member 234 of the discharge guard 230 may be configured to couple to the base 222 of the prophy cup 220.

The discharge guard 230 may be configured to interact with polishing compound, paste, saliva, mixtures thereof, or other materials on the prophy cup 220 to limit discharge of these materials from the prophy cup 220. For example, in the embodiment shown in FIG. 2A, the bristles 240 of the discharge guard 230 may be configured to brush against an outside surface of the cup portion 221, preventing discharge materials from building up on the outside surface of the cup portion 221.

Bristles 240 interacting with discharge materials on the outside surface of cup portion 221 may thus tend to distribute the discharge materials such that they do not build up and concentrate in clumps with sufficient mass to be thrown from the spinning prophy cup 220. As further detailed below, the bristles 240 may also be configured to direct and/or homogenize discharge materials.

The discharge guard 230 may be coupled to the prophy cup 220 and/or handle (210 of FIG. 2B) in various ways, including the use of fasteners, mating features, interlocks, adhesives, and so forth.

Figure 2B:
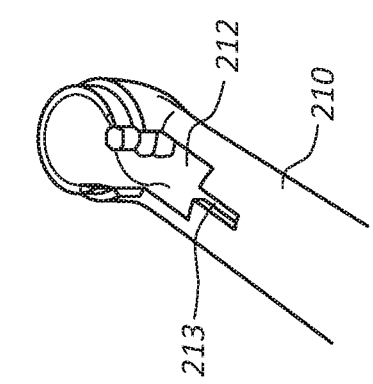
FIG. 2B is a perspective view of a handle for use in connection with the prophy cup and discharge guard of FIG. 2A.
Figure 2C:
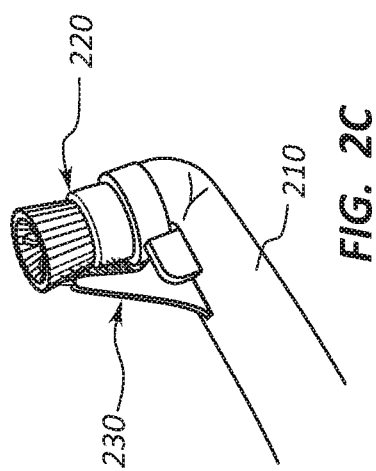
FIG. 2C is a side perspective view of the prophy cup and discharge guard of FIG. 2A coupled to the handle of FIG. 2B.
Figure 2D:
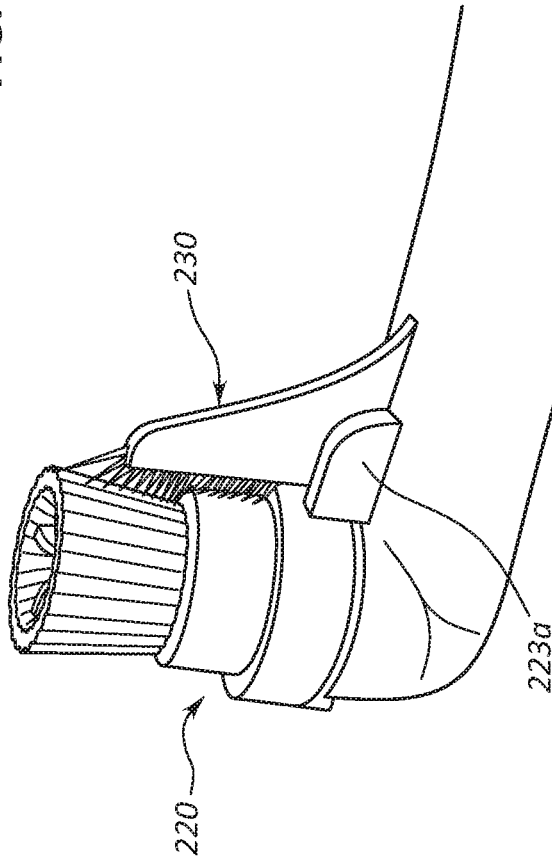
FIG. 2D is another side perspective view of the prophy cup and discharge guard of FIG. 2A coupled to the handle of FIG. 2B.
Figure 2E:
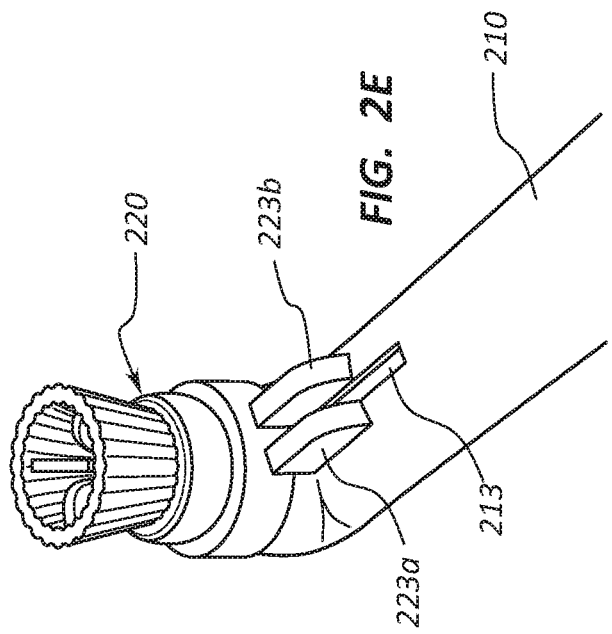
FIG. 2E is a front perspective view of the prophy cup of FIG. 2A coupled to the handle of FIG. 2B.

In the embodiment of FIGS. 2A-2E, the discharge guard 230 is configured to mate with features of both the prophy cup 220 and the handle 210. FIG. 2B is a perspective view of a handle 210 for use in connection with the prophy cup 220 and discharge guard 230 of FIG. 2A. FIG. 2C is a side perspective view of the prophy cup 220 and discharge guard 230 of FIG. 2A coupled to the handle 210 of FIG. 2B. FIG. 2D is another side perspective view of the prophy cup 220 and discharge guard 230 of FIG. 2A coupled to the handle 210 of FIG. 2B. FIG. 2E is a front perspective view of the prophy cup 220 of FIG. 2A coupled to the handle 210 of FIG. 2B.

With reference to FIGS. 2A-2E, a portion of the discharge guard body member 234 may be configured to fit between a first lateral retaining element 223a and a second lateral retaining element 223b. The first lateral retaining element 223a, the second lateral retaining element 223b, and a portion of the prophy cup base 222 may form a three-sided enclosure configured to mate with a portion of the discharge guard body member 234. These features may be sized to fit snugly together, thus preventing displacement of the discharge guard 230 laterally or distally with respect to the prophy cup 220.

Furthermore, the handle 210 may comprise a discharge guard engagement feature 213, such as a channel configured to mate with a portion of the discharge guard body member 234. When the discharge guard 230 is coupled to the prophy cup 220 via the lateral retaining elements 223a, 223b, and the prophy cup base 222 and the prophy cup 220 are coupled to the handle 210, the handle 210 guard engagement feature 213 may cooperate with these components to prevent displacement of the discharge guard 230 in a proximal direction with respect to the handle 210. Additionally, the handle 210 may comprise a cup engagement feature 212 configured to couple to the prophy cup 220.

FIG. 2E illustrates how the lateral retaining elements 223a, 223b, prophy cup base 222, and guard engagement feature 213 of the handle 210 may cooperate to form an opening to receive the discharge guard 230. In some embodiments, as also detailed below, the discharge guard 230 may also comprise a barb or other feature to further engage these elements and prevent displacement of the discharge guard 230 in a direction parallel to the axis of the prophy cup 220. Still further, the mating elements positioned on the prophy cup 220, such as the lateral retaining elements 223a, 223b, could be disposed directly on the handle 210, while mating elements shown on the handle 210 in this embodiment could be positioned on the prophy cup 220. Still further, any of these features could be disposed directly on the discharge guard 230 as well.

With reference to FIGS. 2A-2E, the discharge guard 230 may be formed of a variety of materials, including polymeric materials, composite materials, metals, alloys, and so forth. In some embodiments the discharge guard 230 may comprise a resilient material, such as a shape memory material that tends to return to a shape-set configuration if it is temporarily deformed. Polymeric shape memory materials and shape memory metal alloys (such as Nitinol) are within the scope of this disclosure. Furthermore, the discharge guard 230 may be flexible or rigid and may be formed of a variety of flexible or rigid materials. Again, as outlined above, disclosure relative to the discharge guard 230 of FIGS. 2A-2E may be analogously applied to any of the discharge guards described herein.

Figure 3C:
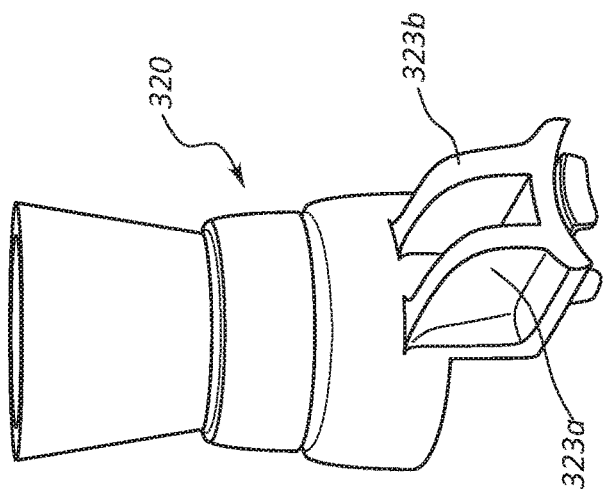
FIG. 3C is a side perspective view of the prophy cup of FIG. 3A.
Figure 3B:
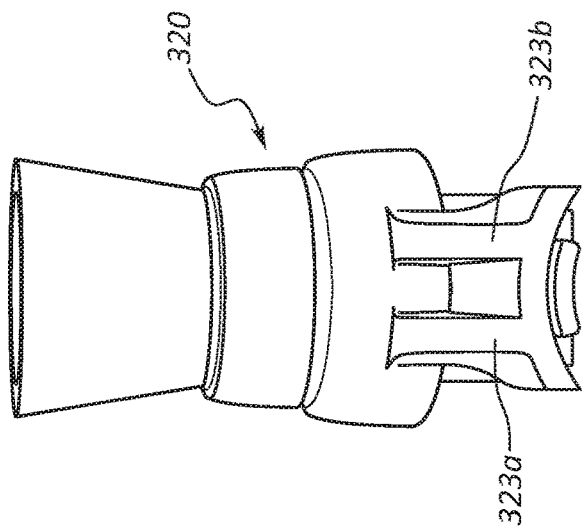
FIG. 3B is a front perspective view of the prophy cup of FIG. 3A.
Figure 3A:
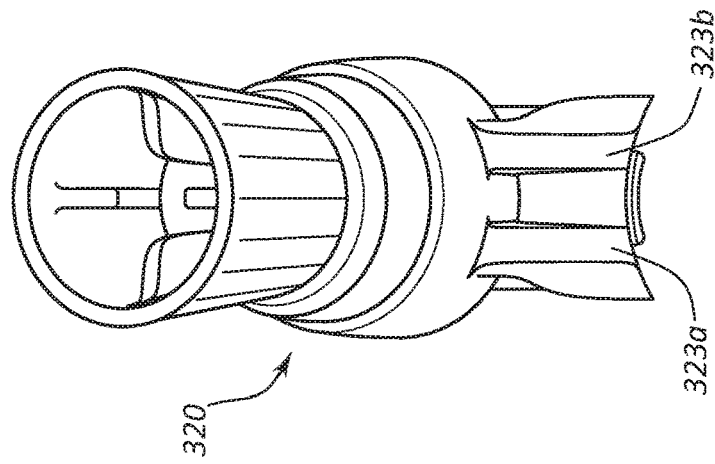
FIG. 3A is a perspective view of another embodiment of a prophy cup.

FIGS. 3A-3C are perspective views of another embodiment of a prophy cup 320. As with the prophy cup 220 of FIGS. 2A-2E, the prophy cup 320 of FIGS. 3A-3C comprises lateral retaining elements 323a, 323b. In the embodiment of FIGS. 3A-3C, the lateral retaining elements 323a, 323b are disposed parallel to each other and generally parallel to a plane including the axis of the prophy cup 320. In other embodiments, the lateral retaining elements 323a, 323b may be disposed at an angle to each other, the prophy cup 320 axis, or both. For example, lateral retaining elements 323a, 323b configured to angle toward each other may be configured to retain a barb or other enlarged feature of a discharge guard. (For example, the barb 531 of the embodiment of a guard 530 shown in FIG. 5.) Angled lateral retaining elements could mate with a barbed discharge guard in a snap-fit type relationship, or the barb could be slid between the lateral retaining elements in a proximal-to-distal direction.

FIGS. 4A-4B illustrate another example of coupling a discharge guard 430 to a handle 410 and prophy cup 420. FIG. 4A is a side view of the prophy cup 420 and discharge guard 430 coupled to a handle 410. FIG. 4B is a front perspective view of the prophy cup 420 of FIG. 4A with the discharge guard 430 and handle 410 removed to show engagement features of the prophy cup 420.

Specifically, in the embodiment of FIGS. 4A and 4B, the prophy cup 420 comprises lateral retaining elements 423a, 423b disposed parallel to each other. When the discharge guard 430 is coupled to the handle 410 and prophy cup 420, the bristles 440 of the discharge guard 430 are disposed along the outside surface of the prophy cup 420 to prevent discharge from the prophy cup 420 while in use.

As with other embodiments, the lateral retaining elements 423a, 423b are disposed on the prophy cup 420 and configured to prevent lateral displacement of the discharge guard 430 with respect to the prophy cup 420. In the embodiment of FIGS. 4A and 4B, displacement of the discharge guard 430 out of the opening between the lateral retaining elements 423a, 423b is prevented by a pin 425 extending between the lateral retaining elements 423a, 423b and extending through an opening in the discharge guard 430. In this embodiment, contact between the discharge guard 430 and the handle 410 prevents rotation of the discharge guard 430 about the pin 425. Embodiments utilizing a pin 425 may or may not also include a barb, such as shown in FIG. 5.

Figure 5:
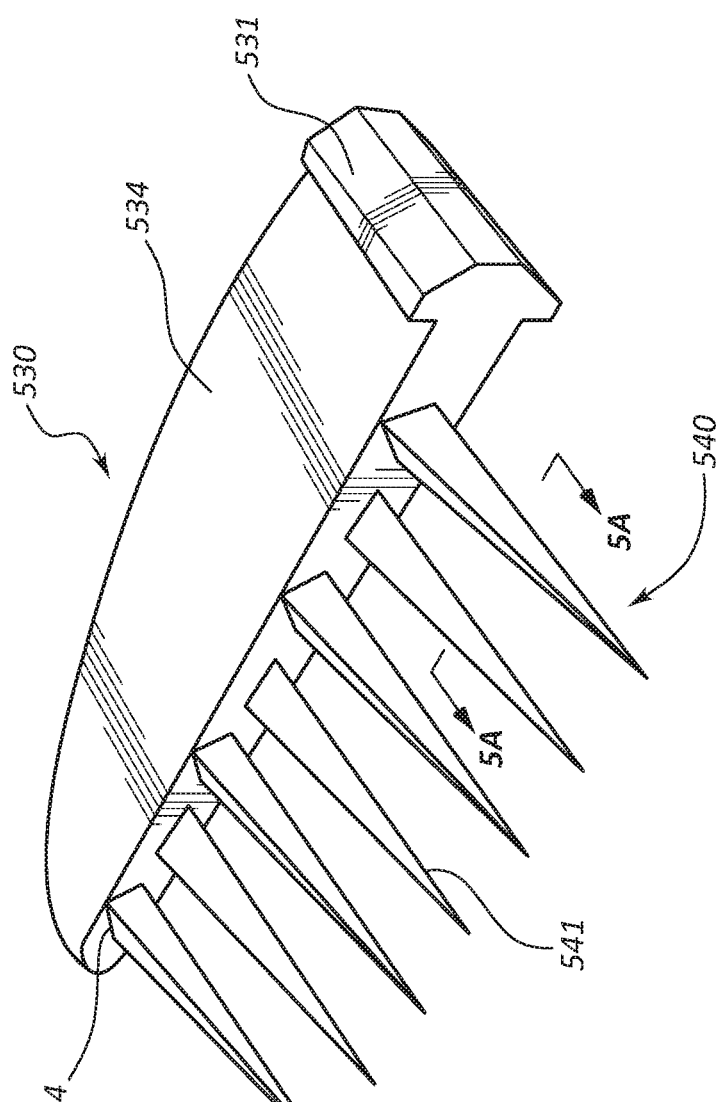
FIG. 5 is a perspective view of a discharge guard.

FIG. 5 is a perspective view of a discharge guard 530. The features of the discharge guard 530 of FIG. 5 can be used with the assemblies and embodiments shown in any of the embodiments described herein. In the embodiment of FIG. 5, the discharge guard 530 comprises a body member 534 coupled to a plurality of bristles 540. In the illustrated embodiment, reference numeral 540 refers to the plurality of bristles collectively, while individual bristles are designated as 541. The discharge guard 530 further comprises a barb 531 coupled to the body member 534 of the discharge guard 530.

The bristles 540 are each coupled to the body member 534 at a base 544 of the w bristle 541, extending to a tip 542 of the bristle 541. In some embodiments, the bristles 540 may be integrally formed with the body member 534, while in other embodiments the bristles 540 may comprise a different material coupled to the body member 534. The bristles 540 may be configured to interact with discharge materials on a prophy cup to distribute and direct the discharge materials.

In some embodiments the discharge guard 530 may be formed as a separate part which is coupleable to a prophy cup and/or handle, such as those shown in FIGS. 1A-1C. In other embodiments, the discharge guard 530 may be an integrally formed component of a prophy cup, a handle, or both. In some embodiments, the discharge guard 530 may be positioned at any location around the prophy cup. For example, the discharge guard 530 may be distal to the prophy cup, proximal to the prophy cup, or at any other location around the prophy cup.

The bristles 540 may be flexible, such that they elastically deform along their length between the base 544 of the bristle 541 and the tip 542 of the bristle 541. In some instances, the bristles 540 may be sized such that they just touch the outside diameter of a prophy cup, while in other embodiments the bristles 540 may be longer such that they bend in the direction of rotation of the prophy cup during use.

In some embodiments, such as that shown in FIG. 5, the bristles 540 may extend from the body member 534 in a perpendicular direction. In other embodiments, some or all of the bristles 540 may extend at an acute angle or other angle with respect to the body member 534. In some instances, a portion of the bristles 540 may be configured to angle toward the rim of a prophy cup to direct discharge materials to the rim of the cup for use in polishing or treating a patient's teeth. Angled bristles are shown with a prophy cup in FIGS. 8A and 8B.

Figure 5A:
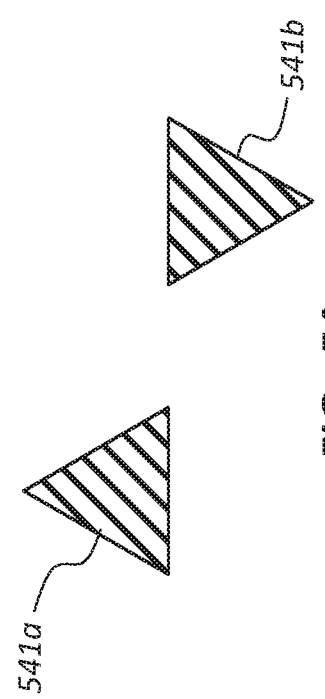
FIG. 5A is a cross-sectional view of a portion of the discharge guard of FIG. 5, taken through line 5A-5A.

In some embodiments the bristles 540 may be sized and/or positioned to mix and/or homogenize discharge materials that interact with the bristles 540. FIG. 5A is a cross-sectional view of two bristles 541a and 541b of the plurality of bristles 540. As shown in this view, the bristles 541a, 541b have triangular cross-sectional shapes. In the embodiment of FIGS. 5 and 5A, adjacent triangular shapes have alternating orientations, with a pointed side of one triangle extending in a direction perpendicular to a flat side of an adjacent bristle. In other words, adjacent bristles may alternate in orientation with respect to a point of the a triangle and a flat side thereof. In other embodiments, the points of the triangles may all be aligned in the same direction, or groups of bristles may be uniform or alternate orientations. Other cross-sectional shapes, including square, diamond, rectangular, prismatic, round, ovoid, and so forth, are likewise within the scope of this disclosure.

In some instances, the bristles 540, having either aligned or opposing orientations, may be configured to mix discharge materials that interact with the bristles 540. For example, when using a prophy cup with a polishing compound, liquids such as water and saliva may mix with the polishing compound to create a non-homogenous or lumpy discharge material. Homogenizing the mixture may facilitate use of a polishing compound or other material to treat a patient's teeth. Additionally, homogenizing the mixture may tend to prevent discharge, as a more uniform mixture may not concentrate or accumulate on an outside surface of a prophy cup to the same degree as a non-homogeneous or lumpy mixture.

Thus, in some instances the bristles 540 may "comb" through a non-homogeneous mixture, breaking up lumps that may otherwise splatter and mixing to create a more homogeneous mixture. Bristles of various shapes, cross-sections, and orientations may be utilized to mix and homogenize discharge material. In the embodiment of FIGS. 5 and 5A, the opposing orientation of adjacent bristles 541a, 541b may be configured for mixing and homogenizing the discharge material.

The bristles 540 may taper from the base 544 of the bristle 541 to the tip 542 of the bristle 541. In other words, the bristles 540 may be closer to each other near the body member 534 of the discharge guard 530 than they are at the tips 542 of the bristles 540. This tapering cross-section may aid in mixing and/or directing the flow of discharge material.

FIGS. 6A-6C are views of another embodiment of a discharge guard 630, a prophy cup 620, and a handle 610. FIG. 6A is a side view of the discharge guard 630 coupled to the prophy cup 620 and handle 610. FIG. 6B is a perspective view of the discharge guard 630, prophy cup 620, and handle 610. FIG. 6C is a top view of the discharge guard 630 decoupled from the prophy cup 620 and handle 610.

In some embodiments, a discharge guard, such as discharge guard 630, may be configured to couple to a prophy cup 620 and/or handle 610 without the prophy cup 620 and/or handle 610 comprising mating or receiving features for coupling to the discharge guard 630. In some examples, the discharge guard 630 may thus be configured as a retrofit-type addition to a dental cleaning system. In some embodiments, the discharge guard 630 may be positioned at any location around the prophy cup 620. For example, the discharge guard 630 may be proximal to the prophy cup as illustrated in FIGS. 6A and 6B, distal to the prophy cup (e.g., see FIGS. 7A and 7B), or at any other location around the prophy cup.

In the embodiment of FIGS. 6A and 6B, the discharge guard 630 comprises a first resilient coupling arm 631a and a second resilient coupling arm 631b. In the illustrated embodiment, the resilient coupling arms 631a, 631b are configured as a snap-fit connector around a portion of the handle 610 adjacent the prophy cup 620. The resilient coupling arms 631a, 631b may elastically deform as they are pushed over the portion of the handle 610, and provide a gripping force or friction fit with the handle 610. In other embodiments, the discharge guard 630 may be configured with resilient coupling features configured to interact with different parts of the handle 610 and/or prophy cup 620. In still other embodiments, a discharge guard 630 may be pinned, coupled with a fastener, coupled with an adhesive, or otherwise coupled to the handle 610 and/or prophy cup 620. When coupled, the bristles 640 of the discharge guard 630 may be adjacent the prophy cup 620. In some embodiments, the bristles 640 may be arranged in a single vertically oriented row as illustrated in FIG. 6C.

FIGS. 7A and 7B illustrate another embodiment of a discharge guard 730 coupled to a prophy cup 720 and handle 710. The discharge guard 730 comprises a coupling collar 731 configured to interact with the handle 710 to couple the discharge guard 730 to the handle 710 and prophy cup 720.

In the embodiment of FIGS. 7A and 7B, the bristles 740 extend from a position on the discharge guard 730 adjacent the base 722 of the prophy cup 720. These bristles 740 initially extend in a direction generally perpendicular to the axis of the prophy cup 720. The bristles 740 may also bend or angle into contact with the outside surface of the prophy cup 720.

Figure 7C:
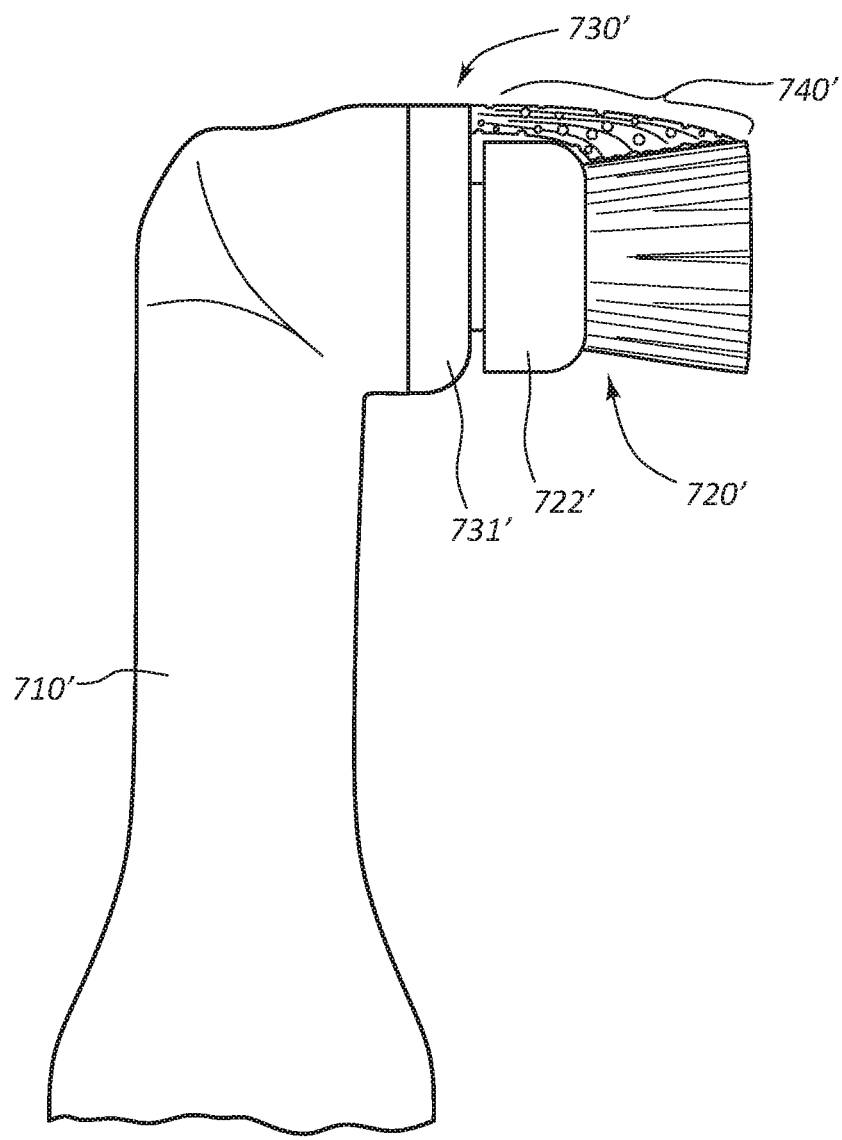
FIG. 7C is a side view of another embodiment of a discharge guard coupled to a prophy cup and handle.

In other embodiments within the scope of this disclosure, the discharge guard may comprise sponges, teeth, fibers, protrusions, or other features in addition to, or in place of, bristles. FIG. 7C illustrates an embodiment of a discharge guard 730' in which a a sponge 740' is configured to interact or make contact with the outside surface of a prophy cup 720'. The interaction between the sponge 740' and the outside surface of the prophy cup 720' enables the sponge 740' to distribute and direct the discharge materials. Various discharge guards within the scope of this disclosure (such as sponges, teeth, fibers, protrusions, etc.) may be positioned analogous to the bristles 740 of FIGS. 7A and 7B, or to the positions of the bristles in any of the other embodiments described herein.

As discussed above, in some embodiments a discharge guard may be configured to direct discharge materials toward a working edge of a prophy cup. For example, in the embodiment of FIG. 8A, a discharge guard 830 is coupled to a prophy cup 820 and a handle 810. The discharge guard 830 comprises bristles 840. FIG. 8A also includes a centerline corresponding to the axis of the prophy cup 820. Prophy cups of other embodiments disclosed herein have analogous axes.

A first portion of the bristles 840a extend perpendicularly from the discharge guard body 834. A second portion of the bristles 840b disposed adjacent a distal edge of the prophy cup 820 are angled with respect to the discharge guard body 834 and to an axis of the prophy cup 820. Bristles disposed at an angle such as the second portion of the bristles 840b of FIG. 8A may tend to direct discharge materials on the outside surface of the prophy cup 820 toward the working edge of the prophy cup 820.

In some embodiments only a portion of the bristles 840 may be angled such as the second portion of the bristles 840b or FIG. 8A. In other embodiments, all the bristles 840 may be angled.

Figure 8B:
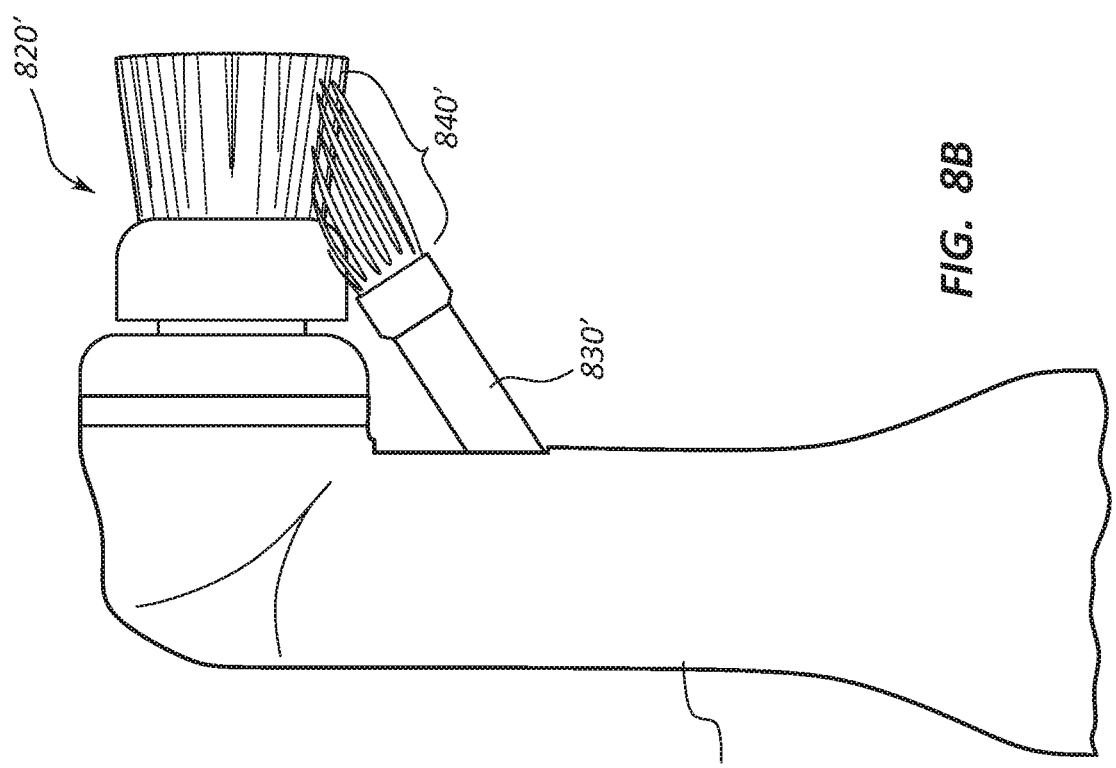
FIG. 8B is a side view of yet another embodiment of a discharge guard.
Figure 8A:
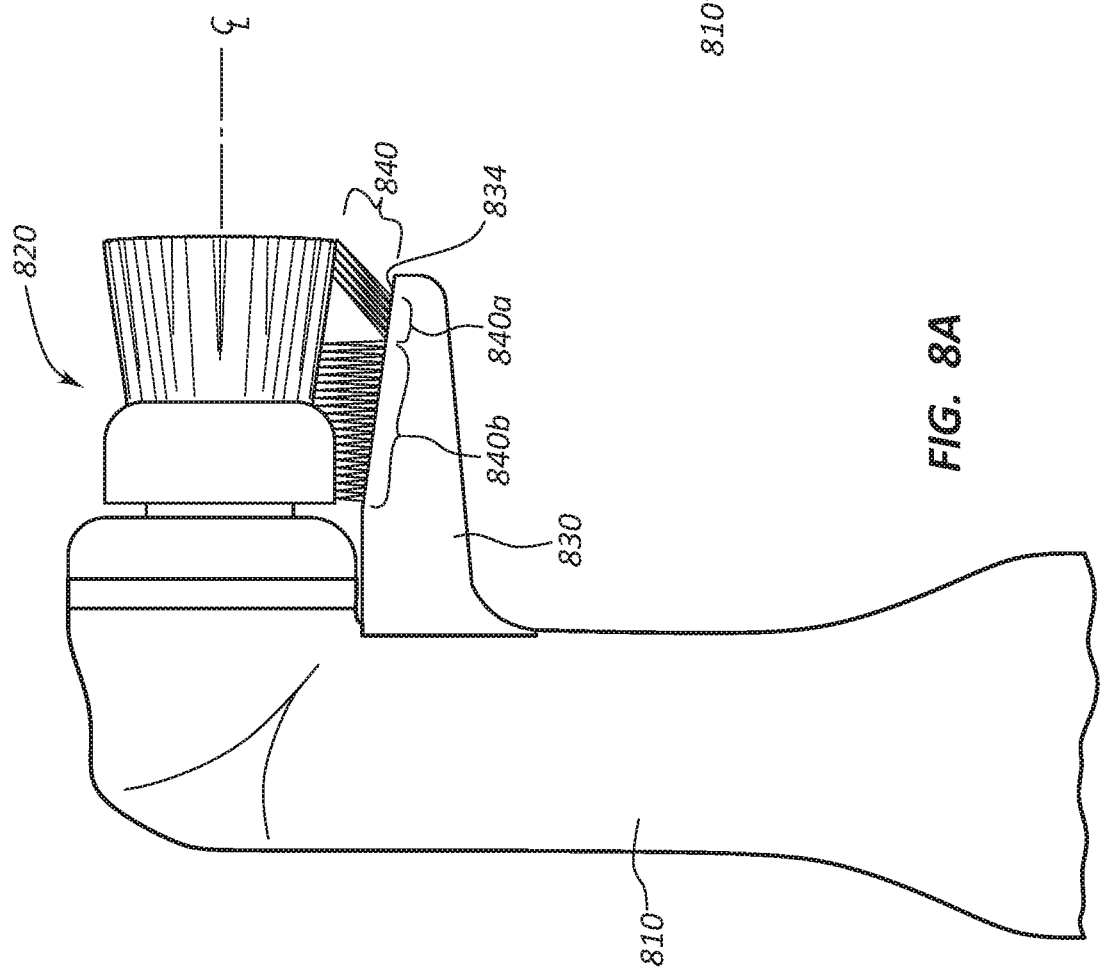
FIG. 8A is a side view of another embodiment of a discharge guard.

FIG. 8B is another embodiment of a discharge guard 830' coupled to a prophy cup 820' and a handle 810'. In the embodiment of FIG. 8B both the discharge guard 830' itself and the bristles 840' are angled with respect to the axis of the prophy cup 820'.

Figure 9A:
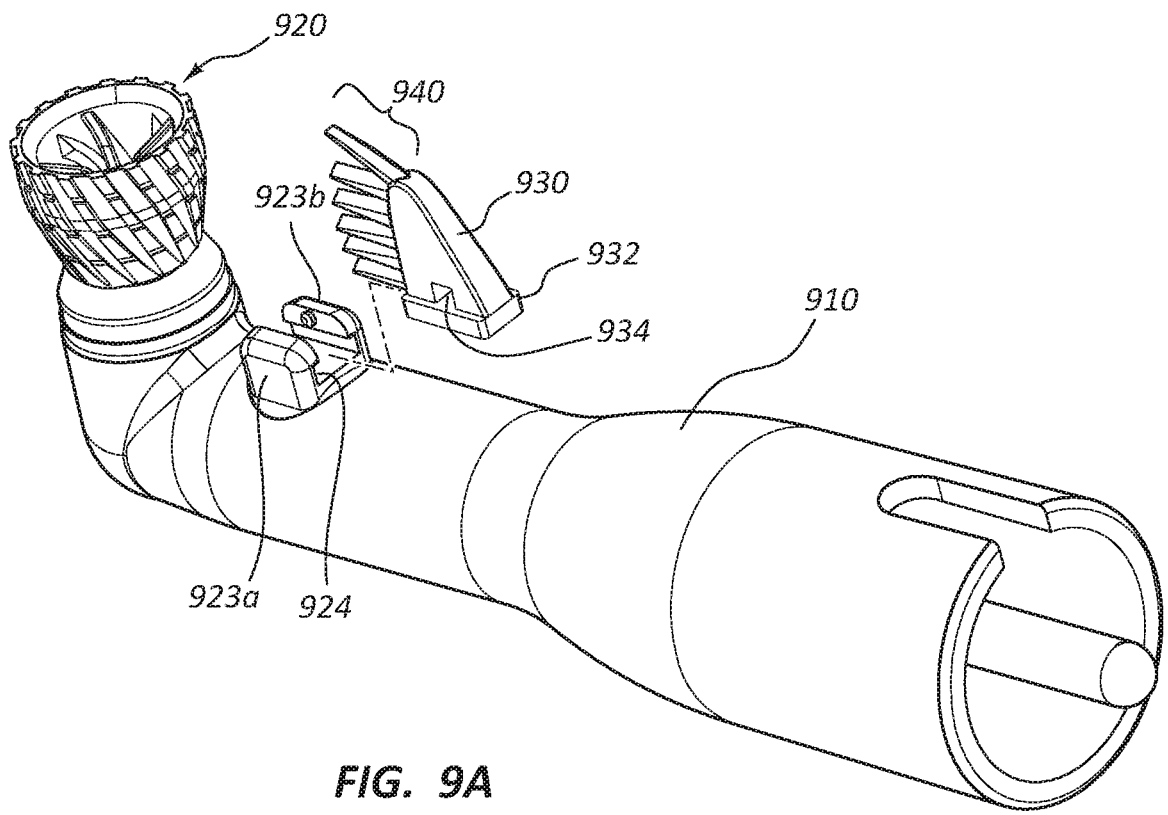
FIG. 9A is a perspective view of another embodiment of a prophy cup, a handle, and a discharge guard uncoupled from the handle.
Figure 9B:
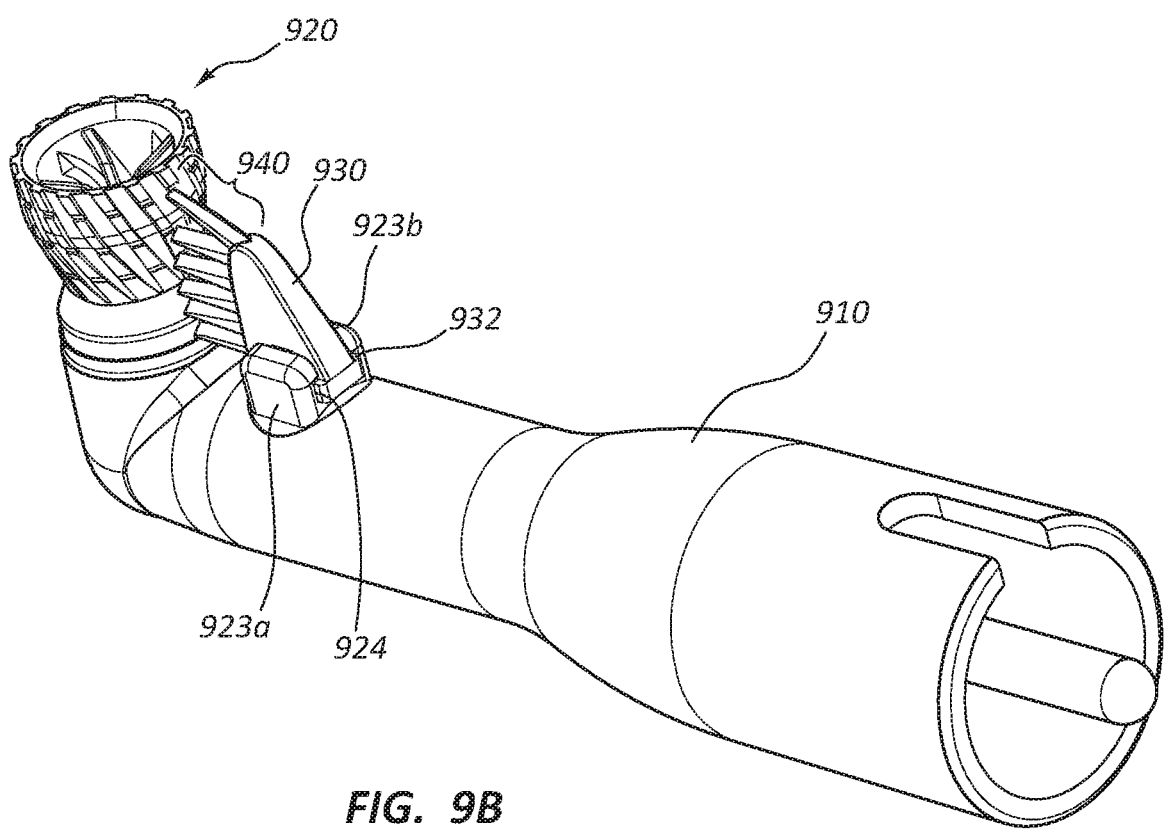
FIG. 9B is a perspective view of the prophy cup, handle, and discharge guard of FIG. 9A with the discharge guard coupled to the handle.

FIGS. 9A and 9B illustrate a perspective view of an embodiment of a prophy cup 920, a discharge guard 930, and a handle 910. Similar to other embodiments disclosed in the disclosure, the prophy cup 920 may be attachable to the handle 910. The discharge guard 930 may be a separate component that couples to the handle 910 independent of the prophy cup 920 via a flange 932 on a bottom portion of the discharge guard 930. The handle 910 may include lateral retaining elements 923a and 923b that are disposed parallel to each other and generally parallel to a plane including the axis of the prophy cup 920. The a lateral retaining elements 923a and 923b may define a mating channel 924 that is configured to receive the flange 932 of the discharge guard 930. The discharge guard 930 may be locked to the handle 910 via a variety of different methods, such as snap fit, fasteners, friction fit, pin, etc. For example, discharge guard 930 may have an aperture 934 configured 3 to receive a pin to lock the discharge guard 930 to the lateral retaining elements 923a and 923b. A user may insert the discharge guard 930 into the mating channel 924 to prevent discharge material from building up on at least a portion of the prophy cup 920. FIG. 9A illustrates the discharge guard 930 uncoupled from the handle 910, and FIG. 9B illustrates the discharge guard 930 coupled to the handle 910. Alternatively, the discharge guard 930 formed on the handle 910 by a molding process such as overmolding or two-shot injection molding.

The discharge guard 930 may further include a plurality of bristles 940 to distribute and direct the discharge material from the outer surface of the prophy cup 920. In some embodiments, the plurality of bristles 940 may be a flattened shape, such as a fin- or slat-like shape. In some embodiments, the plurality of bristles 940 may be in a louvered configuration.

FIGS. 10A-10D illustrate various embodiments of a discharge guard. FIG. 10A illustrates a discharge guard 1030 with a plurality of bristles 1040. The plurality of bristles 1040 help prevent discharge material from building up on at least a portion of the prophy cup 1020. The plurality of bristles 1040 may have a cylindrical shape with a beveled tip (e.g., rounded or pointed). The plurality of bristles 1040 may be arranged in two or more vertically oriented rows in a horizontally aligned configuration. In other words, a respective bristle in row one aligns to the corresponding bristle in row two. FIG. 10B illustrates a top view of FIG. 10A with the plurality of bristles 1040 arranged in two vertically oriented rows. FIG. 10C illustrates a top view of an embodiment of a discharge guard 1030' with a plurality of bristles 1040'. The plurality of bristles 1040' may be arranged in three vertically oriented rows. In some embodiments, there may be more than one, two, or three rows of bristles. FIG. 10D illustrates another embodiment of a discharge guard 1030" with a plurality of bristles 1040" arranged in multiple rows. The plurality of bristles 1040" are staggered from row to row. The staggered bristles 1040" enable the discharge guard 1030" to interact with more surface area of the prophy cup 1020" to remove discharge material a from the surface of the prophy cup 1020". The staggered or overlapping bristles 1040" may encourage and direct the flow of the discharge material. In some embodiments, the bristles may be overlapped, staggered, aligned, or random with various rows of bristles in various combinations. The present disclosure has described various shapes for the bristles in the discharge guard. However, the present disclosure is not limited to the shapes discussed. Other possible shapes include flat (edge- or chisel-like), triangular, trapezoidal, conical, tapered, etc. The tip of the bristles may be blunt, rounded, sharp, pointed, etc.

In some embodiments, the spacing between the bristles may be from 0.01 mm to 2 mm. In some embodiments, the spacing between the bristles may be between 0.05 mm and 0.7 mm. In some embodiments, the spacing between the bristles may be between 0.15 mm and 0.5 mm.

In some embodiments, the rotating dental tool may include multiple discharge guards to help remove the discharge material from the treatment cup. In some embodiments, the rotating dental tool may include a discharge guard distal to the treatment cup and a discharge guard proximal to the treatment cup.

As discussed previously, in some embodiments the discharge guard may be positioned at any location around the cup. For example, the discharge guard may be distal to the prophy cup, proximal to the prophy cup, or at any other location around the prophy cup.

The bristles of the discharge guard may be of various lengths. In some embodiments, for example, the bristles of the discharge guard may be positioned to be in contact with or abut the prophy cup, as illustrated in FIGS. 2D, 4A, 6A, 6B, 7A, 7B, 7C, 8A, and 10A. In other embodiments, the bristles of the discharge guard may be positioned to overlap or extend past the prophy cup, as illustrated in FIG. 8B. Still further, in some embodiments, the bristles of the discharge guard may be spaced apart from the prophy cup, as illustrated in FIG. 10D. Embodiments wherein the bristles of the discharge guard are a combination of lengths of any of the previously discussed embodiments are also within the scope of this disclosure.

In addition to the devices and assemblies discussed above, methods of utilizing the components disclosed herein to direct, control, homogenize, or otherwise interact with discharge fluids are also within the scope of this disclosure.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein 3 may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

What is claimed is:

1. A rotating dental tool discharge guard, comprising:
a handle;
a treatment cup coupled to the handle; and
a guard comprising a plurality of bristles configured to brush against an outside surface of the treatment cup, the plurality of bristles configured to interact with discharge material on the outside surface of the treatment cup and prevent the discharge material from building up on at least a portion of the treatment cup;
wherein the plurality of bristles is the only structure configured to interact with the discharge material on the outside surface of the treatment cup.

2. The rotating dental tool discharge guard of claim 1, wherein the bristles are further configured to homogenize discharge material on the outside surface of the treatment cup.

3. The rotating dental tool discharge guard of claim 1, wherein the bristles are disposed at an acute angle with respect to an axis of the treatment cup.

4. The rotating dental tool discharge guard of claim 1, wherein the bristles have a beveled tip.

5. The rotating dental tool discharge guard of claim 1, wherein the bristles have a blunt tip.

6. The rotating dental tool discharge guard of claim 1, wherein the bristles are arranged in two or more vertically oriented rows.

7. The rotating dental tool discharge guard of claim 6, wherein the bristles in a first row are horizontally aligned with the bristles in a second row.

8. The rotating dental tool discharge guard of claim 6, wherein the bristles in a first row are staggered with the bristles in a second row.

9. A discharge guard for a rotating dental tool, the discharge guard comprising:
a body member; and
a guard element coupled to the body member,
wherein the guard element is a brush configured to interact with discharge material on an outside surface of a treatment cup and prevent the discharge material from building up on at least a portion of the treatment cup;
wherein the brush is the only structure configured to interact with the discharge material on the outside surface of the treatment cup.

10. The discharge guard of claim 9, wherein the brush has a plurality of bristles that extend from the body member of the discharge guard.

11. The discharge guard of claim 10, wherein the bristles are arranged in two or more vertically oriented rows.

12. The discharge guard of claim 10, wherein the bristles have a triangular cross-section.

13. The discharge guard of claim 10, wherein the bristles have a conical shape with a rounded tip.

14. The discharge guard of claim 9, wherein the discharge guard is attachable to a handle of the rotating dental tool.

15. The discharge guard of claim 9, wherein the body member further comprises a first resilient coupling arm and a second resilient coupling arm that extend from the body member and are configured to couple to the treatment cup of the rotating dental tool.

16. The discharge guard of claim 9, wherein the discharge guard is attachable to a distal portion to the treatment cup.

* * * * *